(12) United States Patent
Onorato Estevez

(10) Patent No.: US 11,485,310 B2
(45) Date of Patent: Nov. 1, 2022

(54) AIRBAG SYSTEM FOR A VEHICLE AND METHOD FOR MANUFACTURING THE AIRBAG SYSTEM

(71) Applicant: Faurecia Interieur Industrie, Nanterre (FR)

(72) Inventor: David Onorato Estevez, Barcelona (ES)

(73) Assignee: Faurecia Interieur Industrie, Nanterre (FR)

( * ) Notice: Subject to any disclaimer, the term of this patent is extended or adjusted under 35 U.S.C. 154(b) by 191 days.

(21) Appl. No.: 16/394,909

(22) Filed: Apr. 25, 2019

(65) Prior Publication Data
US 2019/0329727 A1    Oct. 31, 2019

(30) Foreign Application Priority Data

Apr. 26, 2018  (EP) .................................... 18305525

(51) Int. Cl.
| | |
|---|---|
| *B60R 21/205* | (2011.01) |
| *B60R 21/215* | (2011.01) |
| *B60R 21/2334* | (2011.01) |
| *B60R 21/16* | (2006.01) |

(52) U.S. Cl.
CPC .......... *B60R 21/205* (2013.01); *B60R 21/215* (2013.01); *B60R 21/2334* (2013.01); *B60R 2021/161* (2013.01)

(58) Field of Classification Search
CPC ................ B60R 21/205; B60R 21/215; B60R 2021/21537
See application file for complete search history.

(56) References Cited

U.S. PATENT DOCUMENTS

| | | | | |
|---|---|---|---|---|
| 5,393,089 A | * | 2/1995 | Pakulsky | .............. B60R 21/215 280/728.3 |
| 5,639,115 A | | 6/1997 | Kelly et al. | |
| 6,908,521 B2 | * | 6/2005 | Ponthieu | .............. B60R 21/205 156/73.5 |

(Continued)

FOREIGN PATENT DOCUMENTS

| | | |
|---|---|---|
| DE | 10200526712 A1 | 1/2007 |
| DE | 102006008564 A1 | 8/2007 |

(Continued)

OTHER PUBLICATIONS

European Search Report corresponding to European application No. EP18305525, dated Oct. 22, 2018, 7 pages.

*Primary Examiner* — Barry Gooden, Jr.
(74) *Attorney, Agent, or Firm* — Reising Ethington P.C.

(57) ABSTRACT

An airbag system for a vehicle includes: (i) an airbag chute module which forms a guide to direct an airbag deployment provided with a through-opening, (ii) a deployment panel being movable between a through-opening closing position in which the deployment panel covers at least partially the through-opening and an airbag deployment position in which the deployment panel enables the airbag deployment through the through-opening, and (iii) at least a flexible retention net having a first plane-portion disposed within the airbag chute module, a second plane-portion disposed within the deployment panel and a third portion which extends from the first and second plane-portions. The third portion of the flexible retention net includes an overmolded area.

22 Claims, 4 Drawing Sheets

(56) References Cited

U.S. PATENT DOCUMENTS

| | | | |
|---|---|---|---|
| 7,140,636 B2 * | 11/2006 | DePue | B60R 21/205 |
| | | | 280/732 |
| 7,992,890 B2 * | 8/2011 | Nogaret | B60R 21/215 |
| | | | 280/732 |
| 8,191,924 B2 * | 6/2012 | Schupbach | B60R 21/2165 |
| | | | 280/728.3 |
| 8,424,905 B2 * | 4/2013 | Brunet | B60R 21/2165 |
| | | | 280/728.3 |
| 8,590,923 B2 | 11/2013 | An | |
| 8,998,247 B2 * | 4/2015 | Hoeing | B32B 27/12 |
| | | | 280/728.1 |
| 9,045,106 B2 * | 6/2015 | Pauthier | B29C 45/14 |
| 9,139,152 B2 * | 9/2015 | Nogaret | B60R 21/215 |
| 9,156,428 B2 * | 10/2015 | Edeline | B60K 37/00 |
| 9,975,514 B1 * | 5/2018 | Simon | B60R 21/215 |
| 10,040,227 B2 * | 8/2018 | Lard | B29C 65/4815 |
| 2005/0127641 A1 * | 6/2005 | Cowelchuk | B60R 21/216 |
| | | | 280/728.3 |
| 2009/0218792 A1 | 9/2009 | Nogaret et al. | |
| 2011/0018241 A1 * | 1/2011 | Wagner | B60R 21/2165 |
| | | | 280/728.3 |
| 2012/0104732 A1 * | 5/2012 | An | B60R 21/215 |
| | | | 280/728.3 |
| 2012/0126514 A1 * | 5/2012 | Choi | B60R 21/215 |
| | | | 280/728.3 |
| 2014/0117649 A1 | 5/2014 | Hoeing et al. | |
| 2014/0375026 A1 | 12/2014 | Schupbach | |
| 2014/0375029 A1 | 12/2014 | Pauthier et al. | |
| 2014/0375030 A1 * | 12/2014 | Germain | B60R 21/215 |
| | | | 280/728.3 |
| 2016/0167612 A1 * | 6/2016 | Svensson | B29C 45/14786 |
| | | | 280/728.3 |
| 2018/0001858 A1 | 1/2018 | Hoeing et al. | |
| 2020/0079311 A1 * | 3/2020 | Lee | B60R 21/215 |
| 2020/0339057 A1 * | 10/2020 | Onorato Estevez | B60R 21/06 |
| 2021/0016738 A1 * | 1/2021 | An | B60R 21/215 |

FOREIGN PATENT DOCUMENTS

| | | |
|---|---|---|
| DE | 102009048686 A1 | 4/2011 |
| DE | 102015001103 A1 | 8/2016 |
| FR | 2902727 A1 | 12/2007 |
| FR | 3007348 A1 | 12/2014 |
| WO | WO2007147966 A2 | 12/2007 |
| WO | WO2012051738 A1 | 4/2012 |
| WO | WO2013020669 A1 | 2/2013 |

* cited by examiner

AIRBAG SYSTEM FOR A VEHICLE AND METHOD FOR MANUFACTURING THE AIRBAG SYSTEM

TECHNICAL FIELD

The invention relates to vehicle industry and more precisely to the field of motor vehicle. The invention also pertains to the field of airbag systems for such vehicles. The invention relates to the airbag deployment.

BACKGROUND

Usually, a vehicle comprises at least one airbag system intended to protect users of the vehicle in case of car accident. The airbag system is for instance integrated with an instrument panel of the interior of the vehicle.

An airbag system generally comprises an airbag receiving module which receives a folded airbag able to be inflated by an inflation device. The airbag system also comprises an airbag chute module which forms a guide to direct deployment of the airbag when this latter is inflated by the inflation device. The airbag chute module comprises a through-opening through which the airbag is deployed in the interior of the vehicle to protect the users.

Generally, the through-opening of the airbag chute module is covered by a deployment panel. The deployment panel can be overmolded by the instrument panel or also can be a portion of the instrument panel. The deployment panel can comprise for example one flap (U-shape) or two flaps (H-shape, I-shape). The deployment panel is configured, for instance by means of a weakness line, to open during airbag deployment. The through-opening is configured to be covered by the deployment panel in the absence of an impact, the deployment panel enabling the airbag deployment through the through-opening in case of an impact by moving away from the through-opening. Consequently, the airbag can be deployed in the interior of the vehicle through the through-opening of the airbag chute module. The instrument panel also has a portion which has a weakness line such that, in case of inflation of the airbag, this latter is deployed in the interior vehicle and the weakness line of the instrument panel breaks.

To protect the user of the vehicle, the airbag system also comprises a flexible retention net which is arranged within the airbag chute module and within the deployment panel. Thus, the flexible retention net retains the deployment panel, during airbag deployment, in an area which is close to the instrument panel.

Usually, the flexible retention net has a first plane-portion which is disposed within the airbag chute module and second plane-portion which is disposed within the deployment panel. The flexible retention net also comprises a third portion which links the first plane-portion and the second plane portion. The third portion of the flexible retention net extends from an edge of the first-plane portion and from an edge of the second plane-portion.

Moreover, the flexible retention net is generally folded to form the third-portion such that the flexible retention net has a T-shape or an S-shape when the flexible retention net is seen on a plane which is substantially perpendicular to a plane which comprises the free portion of the instrument panel and which comprises a drive direction of the vehicle.

During airbag deployment, when the flexible retention net has a T-shape, the deployment panel firstly translates, up to 18 millimeters, in a direction which is perpendicular to the plane of the instrument panel. Then, the deployment panel rotates around an axis which corresponds to a transversal direction of the vehicle. Hence, the T-shape flexible retention net has the advantages of keeping constant the distance between the deployment panel and a windscreen of the vehicle and having a predictable kinematic behavior.

However, during airbag deployment, when the flexible retention net has an S-shape, the deployment panel firstly rotates in the axis which corresponds to a transversal direction of the vehicle. Secondly, the deployment panel keeps rotating and also slightly translates toward the windscreen of the vehicle. Hence, the rotation axis of the deployment panel is slightly translated toward the windscreen during airbag deployment. The deployment panel immediately rotates during airbag deployment. This is an advantage of the S-shape flexible retention net. Nevertheless, the S-shape flexible retention net has a kinematic behavior which is less predictable.

SUMMARY

An aim of the invention is to provide an airbag system which has an appropriate and predictable kinematic behavior.

To do so, the invention provides, in at least some embodiments, an airbag system for a vehicle comprising:
- an airbag chute module which forms a guide to direct an airbag deployment provided with a through-opening,
- a deployment panel being movable between a through-opening closing position in which said deployment panel covers at least partially the through-opening and an airbag deployment position in which said deployment panel enables the airbag deployment through the through-opening attached to the airbag chute module and being able to break during airbag deployment, and
- at least a flexible retention net comprising a first plane-portion disposed within the airbag chute module, a second plane-portion disposed within the deployment panel and a third portion which extends from the first and second plane-portions, wherein the third portion of the flexible retention net comprises an overmolded area.

The flexible retention net may comprise a T-shape and an overmolded area. Consequently, during airbag deployment, the deployment panel only rotates around an axis which is substantially parallel to a transverse direction of the vehicle. This rotation axis does not translate during airbag deployment. The deployment panel does not translate toward the windscreen. Moreover, the deployment panel has a predictable kinematic behavior.

In preferred embodiments of the invention, one or more of the following arrangements may possibly be used:
- the third portion of the flexible retention net is overmolded by a body distinct from the airbag chute module and the deployment panel;
- the body is integral with the deployment panel and the airbag chute module;
- the third portion of the flexible retention net is configured to allow a rotation of the deployment panel with respect to the airbag chute module around an axis which is substantially parallel to an intersection line between the first plane-portion and the second plane-portion of the flexible retention net;
- the first plane-portion, the second plane-portion and the third portion of the flexible retention net form a T-shape;
- the third portion of the flexible retention net is overmolded by a body, and the third portion and the overmolded body form a rib protruding along a protrusion direction from an intersection line extending at the junction of the airbag chute module and the deployment panel;

the rib extends away from the airbag chute module and the deployment panel except proximate the intersection line;

the rib has a first lateral face and a second lateral face opposite to the first lateral face, the first lateral face is adjacent to an internal face of the airbag chute module (the first lateral face of the rib and the internal face of the airbag chute module facing each other, and the first lateral face of the rib and the internal face of the airbag chute module joining along a first junction line), the second lateral face is adjacent to an internal face of the deployment panel (the second lateral face of the rib and the internal face of the deployment panel facing each other and the second lateral face of the rib and the internal face of the deployment panel joining along a second junction line), the first lateral face forms an angle with the internal face of the airbag chute module which is not less than 10 degrees, and the second lateral face forms an angle with the internal face of the deployment panel which is not less than 10 degrees;

the rib has a first lateral face and a second lateral face opposite to the first lateral face, the first lateral face is adjacent to an internal face of the airbag chute module (the first lateral face of the rib and the internal face of the airbag chute module facing each other and, the first lateral face of the rib and the internal face of the airbag chute module joining along a first junction line), the second lateral face is adjacent to an internal face of the deployment panel (the second lateral face of the rib and the internal face of the deployment panel facing each other and, the second lateral face of the rib and the internal face of the deployment panel joining along a second junction line), the first lateral face is away from the internal face of the airbag chute module, except along the first junction line, and the second lateral face is away from the internal face of the deployment panel, except along the second junction line;

the overmolded area of the third portion of the flexible retention net is a free edge of the third portion;

the third portion corresponds to a folded portion of the flexible retention net;

the overmolded area comprises three distinct sectors;

the three distinct sectors are aligned;

the deployment panel has a weakness line which is able to break during airbag deployment and a supplementary line which covers the third portion of the flexible retention net such that the weakness line and the supplementary line delimit a rectangle or a square;

the third portion of the flexible retention net has two longitudinal ends along a longitudinal direction and the overmolded area extends away from said two ends;

the overmolded area extends on the entire third portion of the flexible retention net along the longitudinal direction;

the overmolded area extends at least on half of the third portion of the flexible retention net along a deployment direction which is preferably substantially perpendicular to the longitudinal direction;

the overmolded area extends on the entire third portion of the flexible retention net along a direction which is preferably a direction substantially perpendicular to the longitudinal direction;

the third portion of the flexible retention net has its greatest dimension in the longitudinal direction;

the third portion of the flexible retention net is mainly overmolded and comprises at least one portion which is not overmolded; this means that a majority of the third portion is overmolded but comprises a smaller portion which is not overmolded;

the third portion of the flexible retention net is mainly overmolded and comprises four portions, aligned along the longitudinal direction which is a direction along which the third portion of the flexible retention net has its greatest dimension, which are not overmolded.

The invention also provides a trim assembly comprising an airbag system as above described. The trim assembly can be an instrument panel.

The invention finally provides a method for manufacturing the airbag system as above described which comprises at least the following steps:

providing the flexible retention net, the airbag chute module and the deployment panel, the first plane-portion of the flexible retention net is disposed within the airbag chute module, the second plane-portion of the flexible retention net is disposed within the deployment panel, and the third portion of the flexible retention net is overmolded.

The airbag chute module can be made by means of injection molding. The deployment panel can also be made by means of injection molding.

BRIEF DESCRIPTION OF THE DRAWINGS

Other features and advantages of the invention will become apparent from the following description of two embodiments, given by way of a non-limiting example, with reference to the accompanying drawings.

DETAILED DESCRIPTION OF TWO EMBODIMENTS OF THE INVENTION

Figure 1:
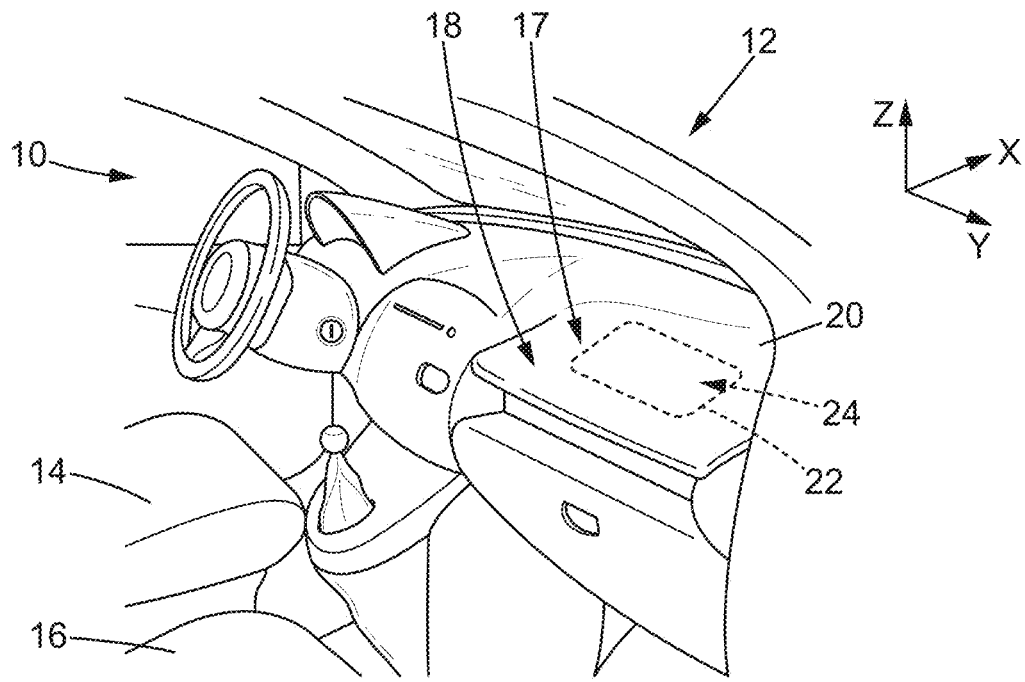
FIG. 1 is a perspective view of an interior of a vehicle which includes an airbag system of the invention.

FIG. 1 shows an interior 10 of a vehicle 12. In this embodiment, the vehicle 12 is a motor vehicle. However, the vehicle 12 could be any types of vehicle which can have an airbag system.

In FIG. 1, a lateral direction X is illustrated. In the illustrated embodiment, the lateral direction X is substantially a direction for the vehicle 12 when this vehicle 12 is going forward. Thus, the lateral direction X is substantially going from the rear to the front of the vehicle 12 in the illustrated embodiment. A longitudinal direction Y, which is transverse with respect to the lateral direction X, is also illustrated. The longitudinal direction Y is going from the left to the right of the vehicle 12. Similarly, a deployment direction Z is illustrated and is going substantially vertically from the bottom towards the top of the vehicle 12 in the illustrated embodiment. These directions X, Y, Z are illustrated when the vehicle 12 is on a normal position of use.

The interior 10 of the vehicle 12 includes two seats 14, 16. The seat 14 is a driver seat and the seat 16 is a front passenger seat. The interior 10 of the vehicle 12 also includes a trim assembly 17 which is, in this embodiment, an instrument panel 18 which includes a glove box in front of the passenger seat 16. Of course, the invention can be embodied in any of a variety of types of trim assembly 17.

Above the glove box, in reference to the deployment direction Z, the instrument panel 18 includes a portion 20 which extends substantially horizontally. The portion 20 of the instrument panel 18 includes a flap section 22 which forms an upper portion of an airbag system 24. This flap section 22 is surrounded by a portion slightly weakened compared to the rest of the portion 20 such that, if required, for instance in the event of a vehicle impact, an airbag can break the portion surrounding the flap section 22 and deploy in the interior 10 of the vehicle 12 to protect a user seated on the passenger seat 16. Thus, the airbag system 24 forms a front passenger airbag system. However, the airbag system 24 can be arranged in other place of the interior 10 of the vehicle 12.

The airbag system 24 will now be described more precisely.

The airbag system 24 comprises an airbag chute module 26, a deployment panel 28 and a flexible retention net 30. The airbag system 24 also comprises an airbag receiving module, not illustrated.

The airbag receiving module receives an airbag which is not inflated. The airbag receiving module also comprises an inflation device able to inflate the airbag in case of an impact.

Figure 2:
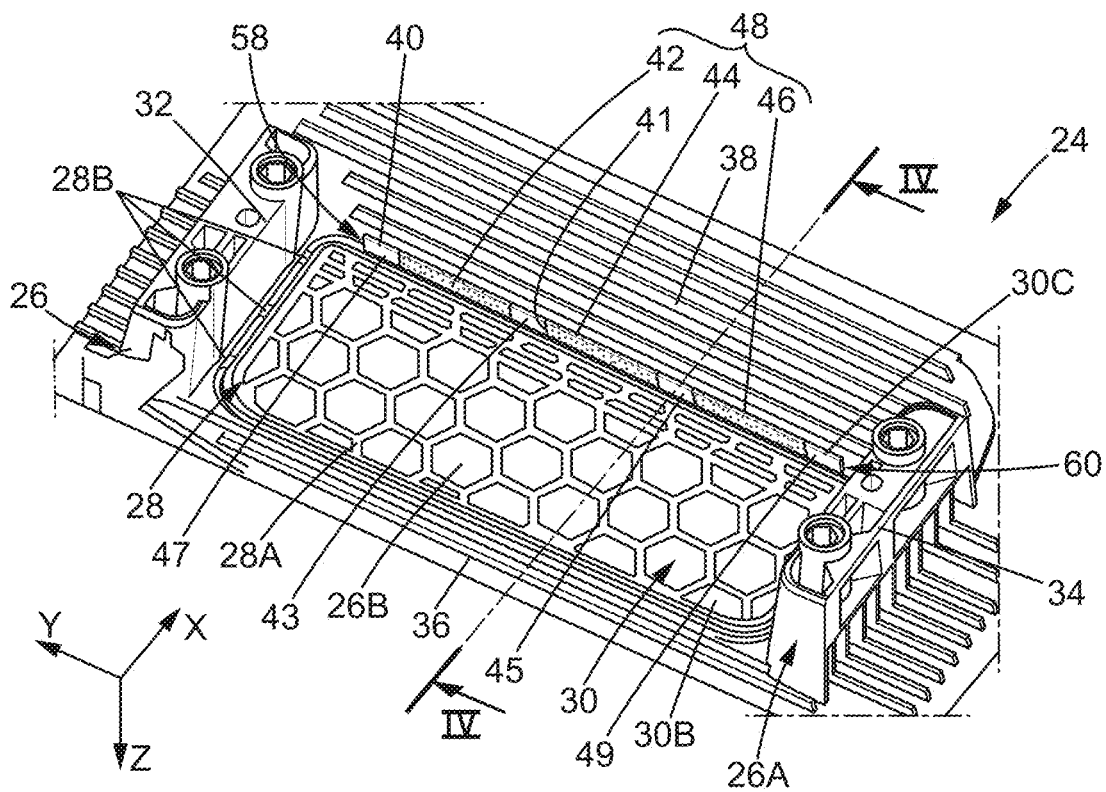
FIG. 2 is a perspective view of an airbag chute module of the airbag system according to a first embodiment of the invention.
Figure 3:
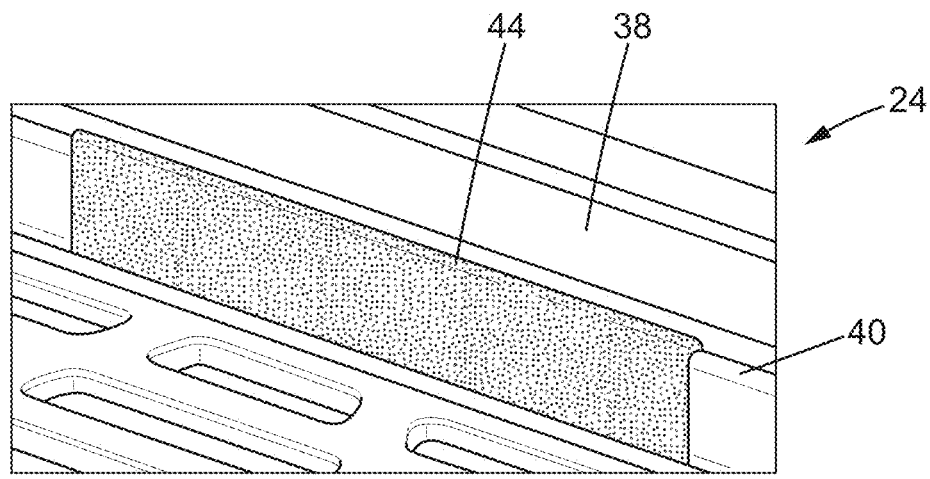
FIG. 3 is an enlarged portion of FIG. 2.

The airbag chute module 26 is illustrated, among others, on FIGS. 2 and 3. It should be noted that in FIGS. 2 and 3, the deployment direction Z is oriented upside down compared to FIG. 1 and to FIG. 4. Indeed, in FIGS. 1 and 4, the bottom of the figure corresponds to the bottom of the vehicle 12 and the top of the figure corresponds to the top of the vehicle 12. In FIGS. 2 and 3, the bottom of the figures corresponds to the top of vehicle 12 and the top of the figures corresponds to the bottom of the vehicle 12. The airbag chute module 26 forms a guide in order to direct the airbag deployment within the interior 10 of the vehicle 12.

Consequently, the airbag chute module 26 comprises a main body 26A which delimits a through-opening 26B which extends in a horizontal plane XY. The through-opening 26B has a rectangular shape. The main body 26A of the airbag chute module 26 includes two lateral sides 32, 34, and two longitudinal sides 36, 38. The lateral side 32 corresponds to the right side of the vehicle 12 whereas the lateral side 34 corresponds to the left side of the vehicle 12. The longitudinal side 36 corresponds to the rear side of the vehicle 12 and the longitudinal side 38 corresponds to the front side of the vehicle 12. The two lateral sides 32, 34 comprise attachment means to the airbag receiving module. The four sides 32, 34, 36, 38 delimit the through-opening 26B. The airbag chute module 26 can be made from a plastic material and can be made by means of injection molding.

The deployment panel 28 covers the through-opening 26B of the airbag chute module 26. Moreover, the deployment panel 28 is attached to the main body 26A of the airbag chute module 26. The deployment panel 28 comprises a main body 28A which comprises several hexagonal bodies. The deployment panel 28 also comprises six hinges 28B which form attachment means to the main body 26A of the airbag chute module 26. Three hinges 28B are attached to the lateral side 32 and three other hinges are attached to the lateral side 34. The deployment panel 28 is also attached to the two longitudinal sides 36, 38.

However, the deployment panel 28 is firmly attached to the front longitudinal side 38 but weakly attached to the rear longitudinal side 36. Thus, during airbag deployment, the deployment panel 28 is able to break so the airbag can deploy in the interior 10 of the vehicle 12 through the through-opening 26B. During airbag deployment, the six hinges 28B breaks and the deployment panel 28 is also not attached anymore to the rear longitudinal side 36 of the airbag chute module 26. Nevertheless, the deployment panel 28 keeps being attached to the front longitudinal side 38. Thus, the deployment panel 28 is movable between a through-opening closing position in which the deployment panel 28 covers the through-opening 26B and an airbag deployment position in which the deployment panel 28 enables the airbag deployment through the through-opening 26B. The deployment panel 28 can be made from the same material as the one of the airbag chute module 26. In this embodiment, the deployment panel 28 comprises one flap (U-shape).

Moreover, the deployment panel 28 is covered by the flap section 22 of the portion 20 of the instrument panel 18. The deployment panel 28 can also be the flap section 22 of the portion 20 of the instrument panel 18. The deployment panel 28 can also be overmolded by the flap section 22. In this embodiment, the deployment panel 28 can be linked to the airbag chute module 26 only by mean of the flexible retention net 30.

In another embodiment, the deployment panel 28 comprises two flaps in H-shape. In this embodiment the deployment panel 28 is firmly attached to both of the rear longitudinal side 36 and the front longitudinal side 38. The deployment panel 28 comprises a weakness line between the rear longitudinal side 36 and the front longitudinal side 38, the weakness line being substantially parallel to at least one of the rear longitudinal side 36 or the front longitudinal side 38 and being able to break during airbag deployment.

The deployment panel can alternatively be in other well-known shapes, for example an I-shape, an envelope-shape.

Figure 4:
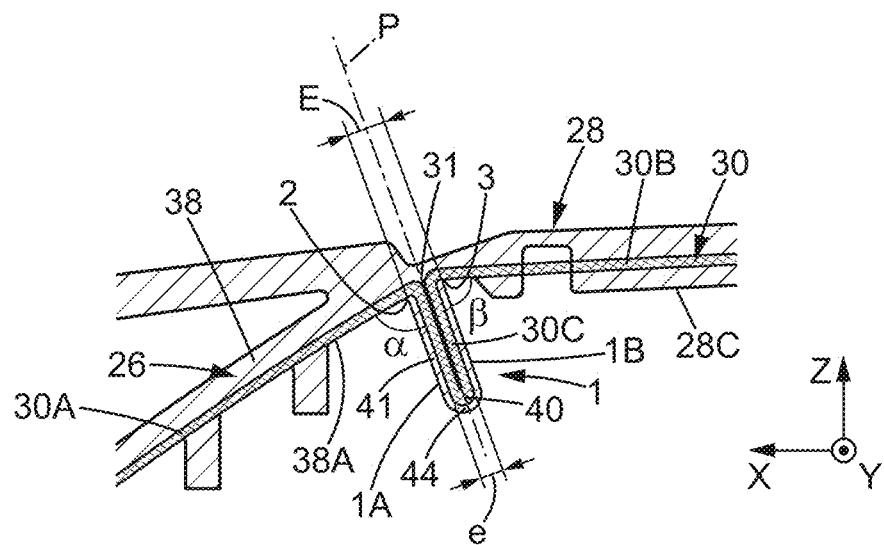
FIG. 4 is a cross-sectional view according to the plane IV-IV of FIG. 2.

The flexible retention net 30 of the airbag system 24 can be seen, among others on FIG. 4. The flexible retention net 30 is intended to prevent the deployment panel 28 from striking the passenger seat 16 during airbag deployment. The flexible retention net 30 also directs the motion of the deployment panel 28 during airbag deployment.

To do so, the flexible retention net 30 comprises a first plane-portion 30A which is disposed within the airbag chute module 26. The flexible retention net 30 also includes a second plane-portion 30B disposed within the deployment panel 28. The first plane-portion 30A and the second plane-portion 30B are encapsulated within respectively the airbag chute module 26 and the deployment panel 28. As one can see in FIG. 4, the first plane-portion 30A and the second plane-portion 30B form an angle which substantially corresponds to the angle between the deployment panel (which is substantially perpendicular to the deployment direction Z) and the front longitudinal side 38 and is higher than 90°. In this embodiment, the angle is substantially equal to 130°.

Moreover, the flexible retention net 30 also comprises a third portion 30C which extends between the first plane-portion 30A and the second plane-portion 30B. The boundary between the first plane-portion 30A and the third portion 30C is close to the boundary between the third portion 30C and the first plane-portion 30A and they substantially correspond to an intersection line 31 extending along the longitudinal direction Y. It should be noted that the third portion 30C corresponds to a folded portion of the flexible retention net 30 which is substantially folded flat. Furthermore, as can be seen on FIG. 4, in a vertical plane ZX, i.e. perpendicularly to the longitudinal direction Y, the flexible retention net 30 has a T-shape. In other words, in a plane which comprises the deployment direction Z and the lateral direction X, i.e. perpendicular to the longitudinal direction Y, when the airbag system 24 is in a normal position of use, the flexible retention net 30 has a T-shape. The third portion 30C forms an angle α with the first plane-portion 30A which is substantially equal to 60°. The third portion 30C also forms an angle β with the second plane-portion 30B which is substantially equal to 70°.

The third portion 30C mainly extends in the longitudinal direction Y. This means that the third portion 30C has its greatest dimension (length) along the longitudinal direction Y.

Furthermore, the third portion 30C has a free edge 40. This free edge 40 is an overmolded portion of the third portion 30C. The free edge 40 is overmolded by a plastic material 41. Thus, as can be seen in FIG. 2, the third portion 30C of the flexible retention net 30 has three overmolded sectors 42, 44, 46 which are distant and aligned along the longitudinal direction Y. These overmolded sectors 42, 44, 46 are distinct one from each other and form an overmolded area. This means that between two overmolded sectors 42, 44, 46, the third portion 30C comprises an intermediate portion 43, 45 which is not-overmolded. Moreover, the third portion 30C has longitudinal ends 58, 60, along the longitudinal direction Y, the third portion 30C comprises end portion 47, 49 which are also not overmolded. The intermediate portion 43, 45 and the end portion 47, 49 form a non-overmolded area. During manufacturing, the third portion 30C can be maintained in the mold by pressing the third portion 30C in the non-overmolded area, more accurately in the intermediate portion 43, 45 and in the end portions 47, 49 proximate the two longitudinal ends 58, 60. Hence, the overmolded area extends away from the two longitudinal ends 58, 60.

It should be noted that the third portion 30C of the flexible retention net 30 is overmolded by a body 48, comprised of the three overmolded sectors 42, 44, 46 and made from the plastic material 41, which is distinct from the airbag chute module 26 and the deployment panel 28. This means that there is no structural link between the overmolding body 48 and the airbag chute module 26 and the deployment panel 28, the overmolding body 48 being only connected to the airbag chute module 26 and the deployment panel 28 at the intersection line 31.

The overmolded body 48 and the third portion 30C of the flexible retention net forms a rib 1 extending between the intersecting line 31 and the free end 40 along a protrusion direction P. The rib 1 has a first lateral face 1A and a second lateral face 1B opposite to the first lateral face 1A. The first lateral face 1A extends substantially parallel to the second lateral face 1B, and they are substantially parallel to the longitudinal direction Y and the protrusion direction P. The first lateral face 1A is adjacent to an internal face 38A of the longitudinal side 38, the first lateral face 1A and internal face 38A facing each other and, the first lateral face 1A and internal face 38A joining along a first junction line 2. The second lateral face 1B is adjacent to an internal face 28C of the deployment panel 28, the second lateral face 1B and the internal face 28C facing each other and, the second lateral face 1B and the internal face 28C joining along a second junction line 3.

The first lateral face 1A forms an angle with the internal face 38A of the longitudinal side 38 which is not less than 10 degrees, corresponds to the angle α and is substantially equal to 60 degrees in the illustrated embodiment. Moreover, the first lateral face 1A is away from the internal face 38A of the longitudinal side 38, except along the first junction line 2 extending along the longitudinal direction Y and proximate the intersection line 31. The first lateral face 1A moves away from the internal face 38A of the longitudinal side 38 from the first junction line 2.

The second lateral face 1B forms an angle with the internal face 28C of the deployment panel 28 which is not less than 10 degrees, corresponds to the angle β and is substantially equal to 70 degrees in the illustrated embodiment. Moreover, the second lateral face 1B is away from the internal face 28C of the deployment panel 28, except along the second junction line 3 extending along the longitudinal direction Y and proximate the intersection line 31. The second lateral face 1B moves away from the internal face 28C of the deployment panel 28 from the second junction line 3.

The overmolding sectors 42, 44, 46, forming the overmolded area, reinforce the third portion 30C of the flexile retention net 30. Thus, during airbag deployment, the third portion 30C prevents the deployment panel 28 from translating in the vertical direction Z with respect to the airbag chute module 26. The third portion 30C allows the deployment panel 28 to rotate around an axis which is substantially parallel to the transverse direction Y and which is substantially parallel to the intersection line 31 between the first plane-portion 30A and the second plane-portion 30B. The rotation axis can also be the intersection line 31.

As shown in the FIG. 4, the rib 1 has a thickness, perpendicularly to the protrusion direction P and the longitudinal direction Y, the rib 1 has a first thickness e which is between 0.5 millimeter and 1 millimeter in the non-overmolded areas (i.e. in the intermediate portion 43, 45 and in the end portion 47, 49) and a second thickness E which is between 1.5 and 3 times equal to the first thickness e, preferably substantially equal to 1.5 millimeter in the overmolded sectors 42, 44, 46 (i.e. the overmolded body 48 has the second thickness E).

In the embodiment where the deployment panel 28 comprises one flap, the airbag system 24 comprises one flexible retention net 30.

In the embodiment where the deployment panel 28 comprises two flaps, the airbag system 24 can comprise one flexible retention net 30 or the airbag system 24 can comprise two flexible retention nets 30. In the case of the airbag system 24 comprising two flexible retention nets 30, each of the flexible retention nets 30 links one of the flaps to the airbag chute module 26. One flexible retention net 30 is attached to a first flap of the deployment panel 28 and to the front longitudinal side 38 of the airbag chute module 26 and the other flexible retention net 30 is attached to a second flap of the deployment panel 28 and to the rear longitudinal side 36 of the airbag chute module 26.

Figure 5:
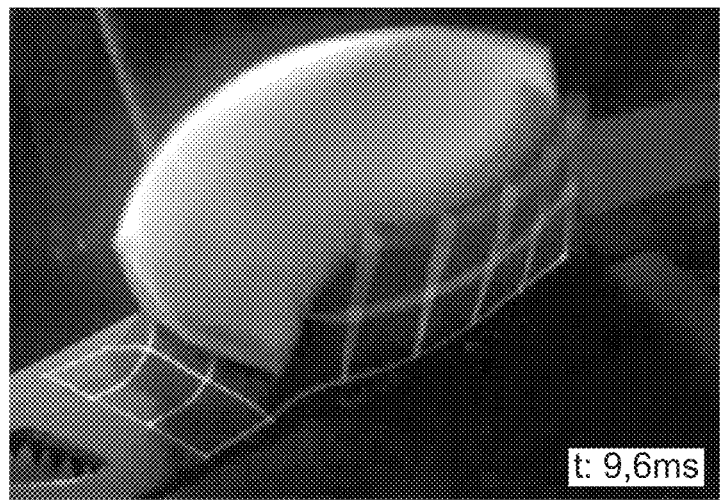
FIG. 5 is a photograph of the airbag system during airbag deployment.

The FIG. 5 illustrates the airbag system 24 during airbag deployment. The FIG. 5 is a photography taken 9.6 milliseconds after actuation of the airbag system 24. As one can see, the deployment panel 28 only rotates around an axis which is substantially parallel to the longitudinal direction Y. The airbag system 24 has a predictable and good kinematic behavior.

A method for manufacturing the airbag system 24 is described hereinafter.

First, the flexible retention net 30 is made for example also by means of injection molding.

Secondly, the flexible retention net 30 is folded in the third portion 30C and the flexible retention net 30 is disposed in a cavity of an injection mold.

The longitudinal ends 48, 50 of the third portion 30C of the flexible retention net 30 are pressed on opposite sides by pressing portions of the injection mold in order to maintain the third portion 30C of the flexible retention net 30 with respect to the injection mold.

Then, injecting melted material 41 in the cavity of the injection mold and overmolded the flexible retention net 30 with the melted material, the first plane-portion 30A of the flexible retention net 30 being within the airbag chute module 26, the second plane-portion 30B of the flexible retention net being within the deployment panel 28 and the third portion 30C of the flexible retention net 30 being overmolded by the overmolding body 48.

It is to be understood that the embodiment of the invention disclosed herein are illustrative of the principles of the invention and that other modifications may be employed which are still within the scope of the invention.

For example, the through-opening 26B can have a square shape.

The flexible retention net 30 can also have a shape different from the illustrated shape.

The overmolded area could have several shapes.

For instance, the overmolded area can extends on the entire third portion 30C along the longitudinal direction Y or the deployment direction Z. It can also extend on half of the third portion 30C along the longitudinal direction Y or the deployment direction Z.

Figure 7:
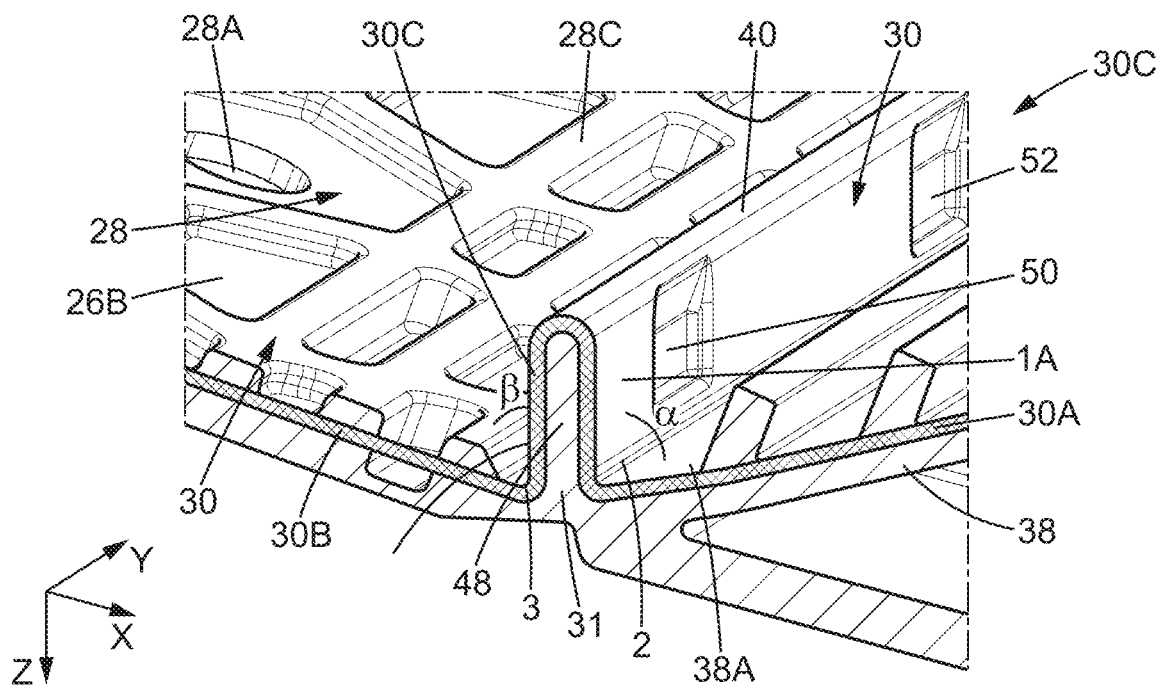
FIG. 7 is a cross sectional view at enlarged scale according to the plane referenced VII-VII in FIG. 6.
Figure 6:
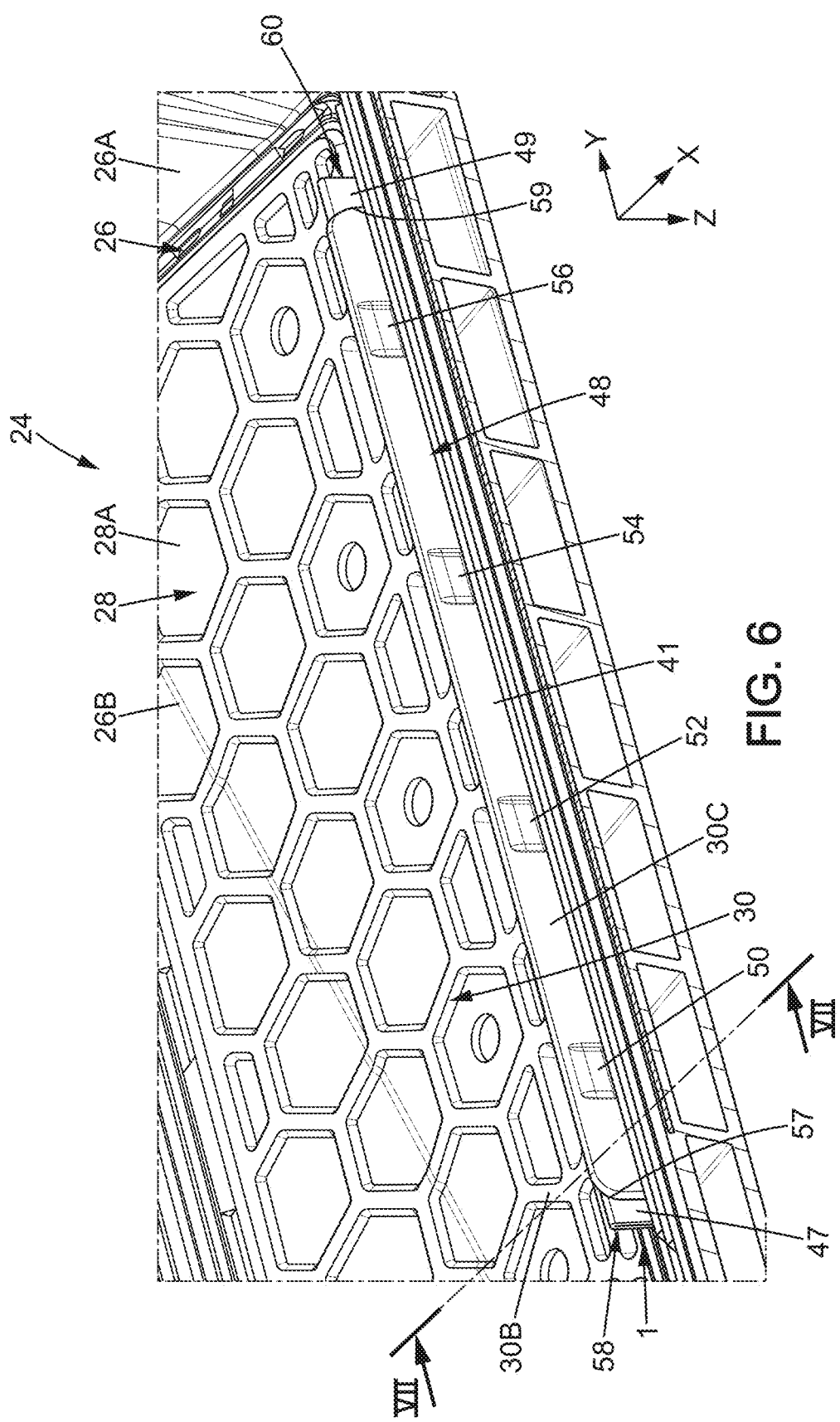
FIG. 6 is a perspective view of an airbag chute module of an airbag system according to a second embodiment of the invention.

Moreover, a particularly preferred embodiment of an airbag system 24 is illustrated in FIGS. 6 and 7. It should be noted that the numeral references of similar objects are the same as in the first embodiment described. The differences between this embodiment and the first embodiment are described below.

In this embodiment, the third portion 30C of the flexible retention net 30 is overmolded by the plastic material 41 and the overmolding body 48 comprises a single portion. The third portion 30C is mainly overmolded by the plastic material 41. However, the third portion 30C comprises four intermediate portions 50, 52, 54, 56 which are not overmolded. The intermediate portions 50, 52, 54, 56 have a square shape (at least rectangular shape) and are aligned along the longitudinal direction Y. These intermediate portions 50, 52, 54, 56 have a relatively small dimension (length) with regards to the dimension (length) of the third portion 30C along the longitudinal direction Y. Moreover, the intermediate portions 50, 52, 54, 56 extend away from the free end 40 of the third portion 30C of the flexible retention net 30. However, regarding the direction Z, the intermediate portions 50, 52, 54, 56 have a dimension which is slightly less than the third portion 30C. Preferably, the third portion 30C has a dimension along the Z-direction which is substantially equal to 10 millimeters.

Moreover, the third portion 30C comprises end portions 47, 49 at the longitudinal ends 58, 60, along the longitudinal direction Y, the third portion 30C is also not overmolded by the plastic material 41 in the end portions 47, 49. So, the overmolding body 48 extends continuously between the end portions 47, 49 along the free edge 40 of the flexible retention net 30 in the longitudinal direction Y.

Moreover, the overmolding body 48, forming the overmolding area, has longitudinal edges 57, 59 along the longitudinal direction Y, the longitudinal edges 57, 59 of the overmolding body 48 are preferably curved and without sharp edges.

As shown in the FIG. 7, the third portion 30C of the flexible retention net 30 is close to the first lateral face 1A and the second lateral face 1B in the overmolding body 48, so that the plastic material 41 is mainly within the fold (loop) of the third portion 30C of the flexible retention net 30.

Consequently, the airbag system 24 according to this embodiment is easier to manufacture by injection molding. Indeed, during manufacturing, the third portion 30C can be maintained in the mold by the four intermediate portions 50, 52, 54, 56 and by the two end portions 47, 49. Moreover, the airbag system 24 according to this embodiment has also a good kinematic behavior during airbag deployment. The airbag system 24 according to this embodiment provides the advantage that the overmolding area of the third portion 30C has no sharp edge which could damage the airbag during its deployment.

The invention claimed is:

1. Airbag system for a vehicle, comprising:
an airbag chute module which is provided with a main body that includes two lateral sides and two longitudinal sides, wherein the two lateral sides and the two longitudinal sides delimit a through-opening, and the airbag chute module forms a guide to direct an airbag deployment,
a deployment panel configured to move between a through-opening closing position, in which said deployment panel covers at least partially the through-opening, and an airbag deployment position, in which said deployment panel enables the airbag deployment through the through-opening, and
at least a flexible retention net comprising a first plane-portion disposed within one of the longitudinal sides of the main body of the airbag chute module, a second plane-portion disposed within the deployment panel, and a third portion which extends from the first plane-portion at an intersection line and from the second plane-portion at the intersection line, the intersection line extending along a three-way junction of the airbag chute module, the deployment panel, and a rib protruding along a single protrusion direction from the intersection line,
wherein:
the third portion of the flexible retention net comprises an overmolded area,
the third portion of the flexible retention net is overmolded by an overmolded body,
the third portion and the overmolded body form the rib,
the rib has a base at the junction and extends away from the junction in the protrusion direction,
an internal face of the airbag chute module and an internal face of the deployment panel are interconnected by the base of the rib at the junction, and
an external face of the airbag chute module is joined together with an external face of the deployment panel at the junction.

2. Airbag system according to claim 1, wherein the overmolded body is not part of the airbag chute module and the deployment panel.

3. Airbag system according to claim 2, wherein the overmolded body is integral with the deployment panel and the airbag chute module.

4. Airbag system according to claim 1, wherein the overmolded body is integral with the deployment panel and the airbag chute module.

5. Airbag system according to claim 1, wherein the third portion of the flexible retention net is configured to allow a rotation of the deployment panel with respect to the airbag chute module around an axis which is substantially parallel to the intersection line.

6. Airbag system according to claim 5, wherein the intersection line is the axis around which the deployment panel rotates during airbag deployment.

7. Airbag system according to claim 1, wherein the first plane-portion, the second plane-portion, and the third portion of the flexible retention net form a T-shape.

8. Airbag system according to claim 1, wherein the rib extends away from the airbag chute module and the deployment panel except proximate the intersection line.

9. Airbag system according to claim 1, wherein:
the rib has a first lateral face and a second lateral face opposite to the first lateral face,
the first lateral face is adjacent to the internal face of the airbag chute module,
the second lateral face is adjacent to the internal face of the deployment panel,
the first lateral face forms an angle with the internal face of the airbag chute module which is not less than 10 degrees, and
the second lateral face forms an angle with the internal face of the deployment panel which is not less than 10 degrees.

10. Airbag system according to claim 1, wherein:
the rib has a first lateral face and a second lateral face opposite to the first lateral face,
the first lateral face is adjacent to the internal face of the airbag chute module,
the second lateral face is adjacent to the internal face of the deployment panel,
the first lateral face is away from the internal face of the airbag chute module, except along a first junction line, and
the second lateral face is away from the internal face of the deployment panel, except along a second junction line.

11. Airbag system according to claim 1, wherein the third portion of the flexible retention net corresponds to a folded portion of the flexible retention net.

12. Airbag system according to claim 1, wherein the third portion of the flexible retention net has two longitudinal ends along a longitudinal direction and the overmolded area extends away from said two longitudinal ends.

13. Airbag system according to claim 12, wherein the third portion has its greatest dimension in the longitudinal direction.

14. Airbag system according to claim 1, wherein the overmolded area extends at least on half of the third portion of the flexible retention net along a deployment direction.

15. Airbag system according to claim 14, wherein the deployment direction is substantially perpendicular to a longitudinal direction along which the third portion of the flexible retention net has its greatest dimension.

16. Airbag system according to claim 1, wherein the overmolded area extends on the entire third portion of the flexible retention net along a deployment direction.

17. Airbag system according to claim 1, wherein the third portion of the flexible retention net is mainly overmolded and comprises at least one portion which is not overmolded.

18. Trim assembly comprising an airbag system according to claim 1.

19. Method for manufacturing an airbag system according to claim 1, comprising:
i) providing the flexible retention net and flat folding the flexible retention net, and
ii) achieving the airbag chute module, the deployment panel, and the overmolded body by overmolding the flexible retention net with melted material, the first plane-portion of the flexible retention net being within the airbag chute module, the second plane-portion of the flexible retention net being within the deployment panel, and the third portion of the flexible retention net being overmolded by the overmolded body.

20. Airbag system according to claim 1, wherein the third portion of the flexible retention net is overmolded by the overmolded body at the overmolded area such that, during airbag deployment, the deployment panel is prevented from translating in the vertical direction with respect to the airbag chute module.

21. Method for manufacturing an airbag system for a vehicle, the method comprising:
i) providing a flexible retention net having a first plane-portion, a second plane-portion, and a third portion which extends from the first plane-portion and the second plane-portion,
ii) pressing the flexible retention net on opposite sides of the third portion, in order to maintain the flexible retention net, and
iii) achieving an airbag chute module, a deployment panel, and a body by overmolding the flexible retention net with melted material, the first plane-portion being within the airbag chute module, the second plane-portion being within the deployment panel, and the third portion being overmolded by the body,
wherein the airbag chute module is provided with a through-opening and forms a guide to direct an airbag deployment, and
wherein the deployment panel is configured to move between a through-opening closing position, in which said deployment panel covers at least partially the through-opening, and an airbag deployment position, in which said deployment panel enables the airbag deployment through the through-opening.

22. Method according to claim 21, wherein the step of pressing includes pressing the flexible retention net at longitudinal ends of the third portion to maintain the flexible retention net.

* * * * *